3,205,199
POLYMERS FROM BIS-PHENOLAMIDES
Jack Preston, Raleigh, and William A. H. Huffman, Durham, N.C., assignors, by mesne assignments, to Monsanto Company, a corporation of Delaware
No Drawing. Filed Dec. 28, 1961, Ser. No. 162,930
6 Claims. (Cl. 260—47)

This invention relates to new synthetic polymeric compositions. More particularly, the invention relates to new and improved linear fiber and filament forming polycarbonate-amides and polyester-amides prepared by the reaction of bis-phenolamides with suitable polymerizable monomers.

Among the linear condensation polymers which have achieved commercial utility are the polyesters and the polyamides. Polyesters are condensation products of one or more glycols with one or more dicarboxylic acids as typified by the terephthalic polyesters. Polyamides are usually referred to as condensation products of dicarboxylic acids of diamines, as typified by nylon type polymers. Polycarbonates represent another well known type of synthetic linear polyesters often considered as a special polyester.

Another type of condensation polymer known as polyester-amide polymers represents an attempt to combine the advantages of the polyesters and the polyamides in a single polymer without the disadvantages inherent in both types. These polyester-amides were usually prepared by direct co-reaction of glycol, dicarboxylic acid and diamine, but their properties were not sufficiently good to make these materials of any great commercial value.

It is accordingly, an object of the invention to provide new and improved fiber and filament forming polyester-amides. Another object of the invention is to provide new and improved highly polymeric linear polycarbonate-amides. A further object of the invention is to provide new polycarbonate-amides from bis-phenolamide and phosgene. An additional object of the invention is to provide new polyester-amides from bis-phenolamide and dicarboxylic acid halides. Other objects and advantages of the invention will become apparent from the specification and claims which follow.

In general, these and other objects of the invention are accomplished by copolymerizing certain bis-phenolamides with polycarbonate or polyester forming monomers. The bis-phenolamides employed in the practice of this invention are those disclosed by our co-pending application, S. N. 162,931, and filed December 28, 1961, wherein new bis-phenolamides having an amide bridge are disclosed. These bis-phenolamides are copolymerized with the usual polyester and polycarbonate forming monomers which are well known in the art to produce the new polymers of this invention. The polymerization is by emulsion or interfacial polymerization or any one of other suitable methods which are normally employed in such reactions. For the preparation of the polyester-amides of this invention a suitable bis-phenolamide is dissolved in a mixture of solvents or in a suitable single solvent such as sodium hydroxide, chloroform, mixtures of sodium hydroxide and water, and other suitable solvents. The bis-phenolamide solution is then brought into contact with a dicarboxylic acid halide. Aliphatic polyester-amides may be prepared by reacting bis-phenolamides with acid halides of suitable dicarboxylic acids such as oxalic, malonic, succinic, glutaric, adipic, pimelic, suberic, sebacic and the like. Aromatic polyester-amides may be prepared by reacting bis-phenolamides with acid halides of suitable aromatic dibasic acids such as isophthalic, terephthalic, uvitic, xylidinic and the like. The polycarbonate amides of this invention may be prepared by reacting the bis-phenolamides of this invention with suitable monomers such as phosgene and derivatives of phosgene such as ester substitutions.

The polymers of this invention may be represented by the general formula

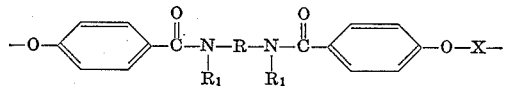

wherein R is a divalent aromatic or aliphatic hydrocarbon radical containing from 1 to 12 carbon atoms, $R_1$ is taken from hydrogen, alkyl radicals containing from 1 to 3 carbon atoms and aryl radicals containing from 6 to 12 carbon atoms and wherein X is taken from the group consisting of

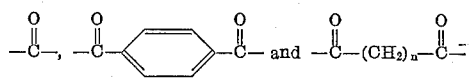

where $n$ is an integer of from 0 to 12. As typical examples of polymers subscribing to the above general formula there may be mentioned

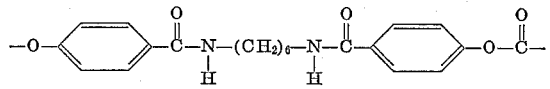

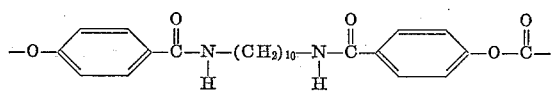

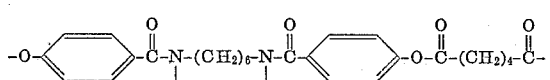

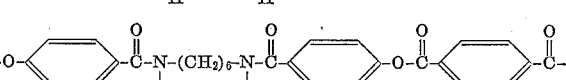

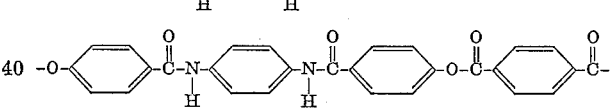

In the practice of this invention substantially equimolar proportions of the two monomer components are normally employed. If it is desirable to produce a polymer with specific properties a slight excess of bis-phenolamide or of the other monomer may be used.

The polymers of this invention are useful in a variety of applications requiring resistance to high temperatures and other degradative conditions. The melting point of the various compositions of this invention vary between 200° and 400° C. with the higher melting points being recorded for the aromatic polyester-amide compositions. The invention is further illustrated by the following examples in which all parts and percents are by weight unless otherwise indicated.

*Example I*

This example illustrates the preparation of a polycarbonate, poly - N,N'hexamethylene - bis(p-benzamide)carbonate, by reacting a specific bis-phenolamide with phosgene. A 10 mg. sample of N,N'-hexamethylene-bis(p-hydroxybenzamide) was placed in a solution of 5 ml. of dioxane-pyridine of equal proportions and phosgene was bubbled through a capillary tube into the mixture for a few minutes. This mixture was poured into methanol and the polymer collected on a filter. The melting point of the dried polymer was approximately 285° C. and filaments could be pulled from a melt.

*Example II*

This example illustrates the preparation of an aliphatic polyester - amide, poly - N,N'-hexamethylene-bis(p-benzamide)adipate. A solution of 0.006 mol of N,N'hexamethylene-bis(p-hydroxybenzamide) in 15 ml. of one normal sodium hydroxide was contacted with a chloroform solution of 0.006 mol of adipyl chloride and the film which formed at the interface was removed continuously as is the usual practice in interfacial polymerization procedures. This film was washed in a blendor and dried. The melting point of the composition was 201° to 205° C. and filaments could be pulled from a melt.

*Example III*

This example presents the preparation of an aromatic polyester - amide, poly - N,N'-hexamethylene-bis(p-benzamide)terephthalate. Into a blendor was placed 0.01 mol of N,N' - hexamethylene - bis(p-hydroxybenzamide), 250 ml. of water, 24 ml. of one normal sodium hydroxide and 0.2 gm. of Duponol ME. Then 0.01 mol of terephthalyl chloride in 30 ml. of chloroform was added to the rapidly stirred mixture. After 5 minutes the emulsion was broken by the addition of one normal hydrochloric acid and the mixture poured into acetone. The polymer was collected on a filter, reslurried with sodium dicarbonate, then washed with water and dried. A differential thermal analysis of this sample shows a melting point of the composition to be 380° C. with decomposition.

As many apparently widely different embodiments of this invention may be made without departing from the spirit and scope thereof, it is to be understood that the same is not to be limited to the specific embodiments thereof, except as defined in the appended claims.

We claim:

1. New synthetic linear condensation polymers consisting essentially of recurring structural units of the formula

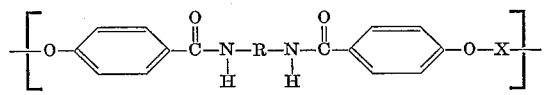

wherein R is selected from the group consisting of methylene radicals containing from 1 to 12 carbon atoms and phenylene, and X is selected from the group consisting of

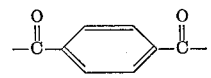

and

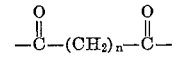

wherein $n$ is an integer of from 0 to 12.

2. As a new composition of matter poly-N,N'-decamethylenebis(p-benzamide)carbonate.

3. As a new composition of matter poly-N,N'-hexamethylenebis(p-benzamide)carbonate.

4. As a new composition of matter poly-N,N'-phenylenebis(p-benzamide)carbonate.

5. As a new composition of matter poly-N,N'-hexamethylenebis(p-benzamide)adipate.

6. As a new composition of matter poly-N,N'-hexamethylenebis(p-benzamide)terephthalate.

References Cited by the Examiner

UNITED STATES PATENTS

| | | | |
|---|---|---|---|
| 2,901,466 | 8/59 | Kibler et al. | 260—75 |
| 3,031,331 | 4/62 | Goldberg | 260—47 |

FOREIGN PATENTS

| | | |
|---|---|---|
| 570,531 | 9/58 | Belgium. |
| 870,905 | 6/61 | Great Britain. |

WILLIAM H. SHORT, *Primary Examiner.*

LOUISE P. QUAST, *Examiner.*